United States Patent [19]

Finlayson

[11] 4,193,806
[45] Mar. 18, 1980

[54] VISCOSITY INCREASING ADDITIVE FOR PRINTING INKS

[75] Inventor: Claude M. Finlayson, Houston, Tex.
[73] Assignee: N L Industries, Inc., New York, N.Y.
[21] Appl. No.: 810,403
[22] Filed: Jun. 27, 1977
[51] Int. Cl.$^2$ ............................................. C09D 11/02
[52] U.S. Cl. ........................................ 106/20; 106/22; 106/31; 106/32
[58] Field of Search ................. 106/20, 30, 31, 32, 106/22

[56] References Cited

U.S. PATENT DOCUMENTS

| 2,531,427 | 11/1950 | Hauser | 52/316 |
| 2,739,067 | 3/1956 | Ratcliffe | 106/32 |
| 2,750,296 | 6/1956 | Curado et al. | 106/31 |
| 2,754,219 | 7/1956 | Voet et al. | 106/32 |
| 3,537,994 | 11/1970 | House | 252/13 |
| 3,864,294 | 2/1975 | Busch, Jr. | 106/31 |
| 3,977,894 | 8/1976 | White et al. | 106/288 Q |
| 4,081,496 | 3/1978 | Finlayson | 260/864 |
| 4,105,578 | 8/1978 | Finlayson et al | 252/316 |

Primary Examiner—Howard E. Schain
Assistant Examiner—W. Thompson
Attorney, Agent, or Firm—Gary M. Nath

[57] ABSTRACT

Printing inks are provided comprising an organic ink vehicle having dispersed therein an ink coloring material and an organophilic clay gellant comprising the reaction product of a smectitetype clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms and the amount of said ammonium compound reacted with said clay being from 100 to 120 milliequivalents per 100 grams of clay based upon 100% active clay.

16 Claims, No Drawings

VISCOSITY INCREASING ADDITIVE FOR PRINTING INKS

This invention relates to printing inks and more particularly to printing inks adapted for high speed printing operations.

The dispersion of finely divided pigments, that is, ink coloring material, in organic ink vehicles to produce a material that is suitable as a printing ink is an exceedingly complex art. The type of surface being printed, the particular printing press being used, the speed of operation, and the time of drying are all basic factors which determine the necessary working qualities for a satisfactory ink.

The greatly expanded circulation of modern newspapers has brought about the development and use of high speed presses in the printing industry. This has required printing inks which set rapidly. Resin-base systems which can be dried by water, steam, or hot air are gradually replacing the conventionally employed drying oils. Modern high speed presses require inks which will set in a matter of seconds rather than minutes.

For high-speed printing, inks must maintain a proper balance of tack, penetration and body control. Too high a degree of tack may cause the paper to tear or the ink to mist at high-press speeds. Ink with insufficient tackiness will not transfer properly in the printing operation. If penetration of the ink is too great, the print becomes visible from the opposite side of the paper, or causes blurring of figures. Poorly controlled penetration may result in smudging after the ink has been supposedly set. An ink must have body to prevent centrifugal throw-off at high-press speeds. In contrast, too viscous an ink will not flow properly from the fountains to the rollers.

These variations and the conditions that are necessary to be met makes it mandatory for the ink industry to rely on a large number of formulations. For example, U.S. Pat. No. 2,750,296 discloses a printing ink containing coloring matter dispersed in a vehicle comprising an oil-soluble resinous binder material dissolved in mineral oil, and containing therein a long chain aliphatic amine bentonite containing 34 carbon atoms in the aliphatic chain. In contrast, U.S. Pat. No. 2,754,219 discloses the formation of an anti-misting printing ink prepared by adding to an ink of which the principal vehicle constituent is a hydrocarbon containing an aromatic constituent, a finely divided organic derivative of montmorillonite in which the organic constituent includes a chain of at least 12 carbon atoms. In addition to these United States patents, U.S. Pat. No. 2,739,067 discloses a printing ink containing a modified clay which forms a gel in the organic vehicle and has a substantial gel characteristic therein. The prior art compounds, however, have all suffered from various disadvantages. For example, some require the undesirable use of polar dispersion additives which may react with other ink formulation components eliminating essential ink properties whereas others require numerous shearing actions through a roller mill to produce a viscosity-stable material which viscosity will not increase on storage with attendant high-labor costs, and concomitant production shut down.

A storage-stable printing ink containing an improved viscosity increasing additive has been unexpectedly discovered comprising an organic ink vehicle having dispersed therein an ink coloring material and an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms and the amount of said ammonium compound reacted with said clay being from 100 to 120 milliequivalents per 100 grams of clay based upon 100% active clay.

The clays used to prepare the organophilic clay gellants of this invention are smectite-type clays which have a cation exchange capacity of at least 75 milliequivalents per 100 grams of clay. Particularly desirable types of clay are the naturally-occurring Wyoming varieties of swelling bentonites and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like, and shearing the mixture with a pugmill or extruder.

Smectite-type clays prepared synthetically by either a pneumatolytic or, preferably a hydrothermal synthesis process can also be used to prepare the present organophilic clays. Representative of such clays are montmorillonite, bentonite, beidellite, hectorite, saponite, and stevensite. These clays may be synthesized hydrothermally by forming an aqueous reaction mixture in the form of a slurry containing mixed hydrous oxides or hydroxides of the desired metals with or without, as the case may be, sodium (or alternate exchangeable cation of mixture thereof) fluoride in the proportions for the particular synthetic smectite desired. The slurry is then placed in an autoclave and heated under autogenous pressure within the range of approximately 100° to 325° C., preferably 274° to 300° C., for a sufficient period of time to form the desired product.

The cation exchange capacity of the smectite-type clays can be determined by the well-known ammonium acetate method.

The quaternary ammonium compounds which are reacted with these smectite-type clays is a methyl benzyl or dibenzyl dialkyl ammonium salt wherein the alkyl groups comprise a mixture of alkyl radicals having from 14 to 22 carbon atoms, preferably 16 or 18 carbon atoms and most preferably 20% to 35% of the alkyl radicals contain 16 carbon atoms and 60% to 75% contain 18 carbon atoms. The salt anion is preferably selected from the group consisting of chloride and bromide, and mixtures thereof, and is more preferably chloride, although other anions such as acetate, hydroxide, nitrite, etc., may be present in the quaternary ammonium salt to neutralize the quaternary ammonium cation. These quaternary ammonium salts can be represented by the formula:

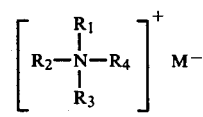

wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, 16 or 18 carbon atoms, and most preferably wherein 20% to 35% said long chain alkyl radicals contain 16 carbon atoms and 60% to 75% of said long chain alkyl radicals contain 18 carbon atoms; and wherein M is selected from the group consisting of chloride, bromide, nitrite, hydroxyl, acetate, methyl sulfate, and mixtures thereof.

The preferred quaternary ammonium salt is methyl benzyl dihydrogenated tallow ammonium chloride. Commercially prepared hydrogenated tallow typically analyzes 2.0% $C_{14}$, 0.5% $C_{15}$, 29.0% $C_{16}$, 1.5% $C_{17}$; 66.0% $C_{18}$ and 1.0% $C_{20}$ alkyl radicals.

The organophilic clays of this invention can be prepared by admixing the clay, quaternary ammonium compound and water together, preferably at a temperature within the range of from 100° F. (38° C.) to 180° F. (82° C.), more preferably from 140° F. (60° C.) to 170° F. (77° C.) for a period of time sufficient for the organic quaternary ammonium compound to coat the clay particles, followed by filtering, washing, drying, and grinding. If using the organophilic clays in emulsions, the drying and grinding steps may be eliminated. When admixing the clay, quaternary ammonium compound and water in such concentrations that a slurry is not formed, then the filtration and washing steps can be eliminated.

Preferably, the clay is dispersed in water at a concentration from about 3% to 7% by weight, the slurry optionally centrifuged to remove non-clay impurities which constitute about 10% to about 50% by weight of the starting clay composition; the slurry agitated and heated to a temperature in the range of from 140° F. (60° C.) to 170° F. (77° C.); the quaternary amine salt added in the desired milliequivalent ratio, preferably as a liquid in isopropanol or dispersed in water; and the agitation continued to effect the reaction.

The amount of the quaternary ammonium compound added to the clay for purposes of this invention must be sufficient to impart to the clay the enhanced dispersion characteristics desired. The milliequivalent ratio is defined as the number of milliequivalents of the quaternary ammonium compound in the organophilic clay, per 100 grams of clay, 100% active basis. The organophilic clays of this invention have a milliequivalent ratio of from 100 to 120. At lower milliequivalent ratios the organophilic clays are ineffective gellants even though they may be effective gellants when dispersed in a conventional manner with a polar additive. At higher milliequivalent ratios, the organophilic clays are poor gellants. However, the preferred milliequivalent ratio within the range of from 100 to 120 will vary depending on the characteristics of the organic system to be gelled by the organophilic clay.

The printing ink is prepared in an economical and practical manner by simply incorporating the organophilic clay gellants into a basic ink composition containing an ink coloring material and an organic ink vehicle. Ink so treated appears to be unchanged and has normal flow properties but is in a condition to become nonmisting in character, having an increased viscosity after being subjected to shear, such as by a single pass through a three roller mill, or during passage over the mills of an ink distributing system. Subjecting the ink to shear is quite common in the ink production art whether or not an increase in viscosity is desired. At least one pass over the three roller mill is commonly required to satisfactorily disperse the ink coloring pigments or materials so that the ink will print satisfactorily on the printing machine. The invention may also be carried out by adding the organophilic clay gellant to a previously prepared finished printing ink. These inks may be prepared by any usual method such as with colloid mills, roller mills, ball mills, etc. in which the ink pigment material becomes well dispersed in the organic ink vehicle by the high shear used in processing. This dispersion of pigment in the vehicle constitutes a normal ink and has the conventional tendency to mist.

The organophilic clay gellant is employed in amounts sufficient to obtain the desired viscosity value and tack in the printing ink. If necessary, the viscosity may be further controlled by the addition of a viscosity reducing agent, for example, naphthenic acid. In general, amounts from 0.1% to 5% by weight of the printing ink is sufficient to greatly reduce the misting tendencies of the ink when utilized in high-speed press printing operations with preferred amounts being from 0.5% to 4% and most preferably from 1% to 3% by weight. When the gellant is employed in concentrations less than 0.1% or greater than 5% by weight of the printing ink, the consistency, flow, and other properties affecting the critical characteristic of the ink are seriously impaired, that is, the desired increase in viscosity and tack is not achieved.

The printing inks of the invention may contain conventional ink additives employed in such printing inks. For example, oil-soluble toners utilized to overcome the brownish tone of mineral oil and carbon black pigment may be employed as well as small amounts of waxes or greases to impart special properties to the printing ink.

The printing inks which may be used with the gellants of the present invention include, but are not limited to, heat set or newsprint ink, water or steam set ink, or lithographic printing ink.

Newsprint inks dry mainly by penetration and absorption, although some heat is utilized to speed drying and prevent smudging. By properly controlling viscosity, tack and yield point with such inks, the organophilic clays of the invention achieve proper penetration in an efficient manner without centrifugal throw off or misting.

When the organophilic clays of the invention are employed with other heat set typographic inks, such as high grade inks for periodicals which contain additives such as binders plus solvents, the inks are extremely flexible, non-smudging, print well, and set rapidly at high temperatures.

The use of the gellant in steam or water set inks greatly affects viscosity and tack by producing a characteristic shortness in the ink.

In contrast, lithographic printing inks are very similar in composition to typographic inks, except that the body is somewhat greater, and pigment concentration is higher. The benefits of using the organophilic clays given above applies here also.

The following examples are given to illustrate the invention, but are not deemed to be limiting thereof. All percentages given throughout the specification are based upon weight unless otherwise indicated.

EXAMPLE 1

A heat-set web-offset blue ink was prepared containing 3.1% heat set paraffin wax compound, 7.8% extender varnish, 49.0% phthalocyanine blue flush, 4.1% polyethylene wax dispersion in varnish (polyethylene compound −124), and 8.5% solvent (Magiesol TM #52 manufactured by Magie Bros. Oil Company, which is a paraffinic hydrocarbon having a molecular weight of 220). Separate ink samples were treated with different organophilic clay derivatives of ammonium compounds, and passed three times over a three roll mill. The ink solvent concentration was varied to permit addition of the clay derivatives. The results are set forth in Table I.

Comparative Runs A and B employed a commercially prepared reaction product of bentonite and dimethyl dihydrogenated tallow ammonium chloride. Inventive Runs 1 and 2 employed a reaction product of bentonite and methyl benzyl dihydrogenated tallow ammonium chloride prepared as follows:

About 350 gallons of a 3% slurry of Wyoming bentonite in water which had been previously treated by centrifugation to remove all nonclay impurities and ion-exchanged to provide the clay in the sodium form was heated to about 150° F. (65.5° C.) and combined with 74 lbs. of 77.8% methyl benzyl dihydrogenated tallow ammonium chloride. The mixture was stirred for 45 minutes, filtered to remove solids, dried at 150° F. and finally ground to yield an organophilic clay gellant containing 110.8 milliequivalents of quaternary ammonium compound per 100 grams of clay.

EXAMPLE 2

The procedure of Example 1 was repeated with the same ink base and solvent except that different commercially available organophilic clays were employed in 2% concentrations. The results are set forth in Table II.

Comparative Run C used TROYKYD ™ XYZ which is a polymerized organic ester additive that increases viscosity, prevents settling, sagging, and improves non-penetration which is manufactured by Troy Chemical Co.

Comparative Run D used CAB-O-SIL ™ M5 which is a silica having a surface area of 200 plus 25 square meters per gram and produced by the hydrolysis of silicon tetrachloride in a flame of hydrogen and oxygen and is manufactured by Cabot Corporation.

Comparative Run E used TROYKYD ™ ABC which is a processed clay that forms a gel with organic vehicles which is manufactured by Troy Chemical Co.

Comparative Run F used a commercially prepared reaction product of bentonite and dimethyl dihydrogenated tallow ammonium chloride.

Inventive Run 3 used the product described in Runs 1 and 2.

EXAMPLE 3

The procedure of Example 1 was repeated in the presence and absence of propylene carbonate as a polar additive dispersant. The results are set forth in Table III.

Comparative Run G used 2% of a commercially prepared reactive product of bentonite and dimethyl dihydrogenated tallow ammonium chloride plus 0.66% propylene carbonate.

Comparative Run H used 2% CAB-O-SIL ™ M5 without a dispersant.

Inventive Run 4 used the product described in Runs 1 and 2 without a dispersant.

EXAMPLE 4

The procedure of Example 1 was repeated except that the viscosity and yield value determinations were made each time the formulation was sheared in the three roll mill. The results are set forth in Table IV.

Comparative Run I employed the same formulation employed in Runs A and B.

Inventive Run 5 employed the same formulation employed in Runs 1 and 2. As the data indicates, the novel printing inks of the invention attain full viscosity levels in one pass over the roll mill, whereas the comparative gellant continually increases in viscosity and has not even attained the viscosity achieved by the inventive formulation in one pass. After a six-month storage period, the inventive printing ink viscosity did not increase. In contrast, the comparative printing ink increased in viscosity demonstrating that full viscosity development was not achieved by the shearing treatment.

Yield value was calculated from the Bingham Equation $$f_B = T - D_B M_B$$

which is the interception on the shear stress axis when the shear rate is zero.

$f_B$ is the yield value.
T is the shear stress.
$D_B$ is the shear rate.
$M_B$ is the viscosity.

Viscosity was determined using a Thwing-Alhert viscometer which is a concentric cylinder viscometer using axial flow.

TABLE I

| Sample | % Clay Derivative | % Solvent | Viscosity (poise) | Tack |
|---|---|---|---|---|
| Control | 0 | 8.5 | 80.0 | 12.0 |
| Comparative Run A | 1% | 7.5 | 95 | 15.2 |
| Inventive Run 1 | 1% | 7.5 | 115 | 15.0 |
| Comparative Run B | 2 | 6.5 | 130 | 16.8 |
| Inventive Run 2 | 2 | 6.5 | 145 | 16.3 |

TABLE II

| Sample | Viscosity (poise) | Tack |
|---|---|---|
| Control | 120 | 16.0 |
| Comparative Run C | 130 | 15.6 |
| Comparative Run D | 130 | 15.7 |
| Comparative Run E | 140 | 16.3 |
| Comparative Run F | 165 | 15.7 |
| Inventive Run 3 | 175 | 16.0 |

TABLE III

| Sample | Viscosity (poise) | Tack |
|---|---|---|
| Comparative Run G | 140 | 16 |
| Comparative Run H | 120 | 15 |
| Inventive Run 4 | 180 | 16.2 |

TABLE IV

| Sample | Pass | Viscosity (poise) | Yield Value dynes/cm$^2$ |
|---|---|---|---|
| Inventive Run 5 | 1 | 235 | 26,000 |
|  | 2 | 235 | 32,000 |
|  | 3 | 237 | 30,000 |
| Comparative Run I | 1 | 192 | 17,000 |
|  | 2 | 208 | 19,000 |
|  | 3 | 213 | 24,000 |

The invention being thus described, it will be obvious that the same may be varied in many ways. Such variations are not to be regarded as a departure from the spirit and scope of the invention and all such modifications are intended to be included within the scope of the following claims.

What is claimed is:

1. A printing ink comprising an organic ink vehicle having dispersed therein an ink coloring material and an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms and the amount of said ammonium compound reacted with said clay being from 100 to 120 milliequivalents per 100 grams of clay based upon 100% active clay.

2. The printing ink of claim 1 wherein said clay is hectorite or sodium bentonite.

3. The printing ink of claim 1 wherein said alkyl groups are 16 or 18 carbon atoms.

4. The printing ink of claim 1 wherein said organophilic clay gellant comprises from 0.1% to 5% by weight of said printing ink.

5. The printing ink of claim 1 wherein said organophilic clay gellant comprises from 1.0% to 3.0% by weight of said printing ink.

6. A printing ink comprising an organic ink vehicle having dispersed therein an ink coloring material and from 1% to 3% by weight of said printing ink of an organophilic clay gellant comprising the reaction product of a smectite-type clay having a cation exchange capacity of at least 75 milliequivalents per 100 grams of clay wherein the clay is selected from the group consisting of hectorite and sodium bentonite and a methyl benzyl dialkyl ammonium compound or a dibenzyl dialkyl ammonium compound, said dialkyl groups comprising a mixture of alkyl radicals, having from 14 to 22 carbon atoms wherein 20% to 35% of said alkyl radicals contain 16 carbon atoms and 60% to 75% of said alkyl radicals contain 18 carbon atoms, the amount of said ammonium compound reacted with said clay being from 100 to 120 milliequivalents per 100 grams of clay based upon 100% active clay.

7. A printing ink comprising an organic ink vehicle having dispersed therein an ink coloring material and an organophilic clay gellant comprising the reaction product of a hectorite or sodium bentonite clay having a cation exchange capacity of at least 75 milliequivalents per 100 grams of clay and a quaternary ammonium compound represented by the formula;

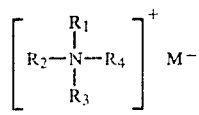

wherein $R_1$ is $CH_3$ or $C_6H_5CH_2$; $R_2$ is $C_6H_5CH_2$; and $R_3$ and $R_4$ are each a hydrogenated tallow group; and M is selected from the group consisting of chloride, bromide, nitrite, hydroxyl, acetate, methyl sulfate, and mixtures thereof; and wherein the amount of ammonium compound reacted with said clay is from 100 to 120 milliequivalents per 100 grams of clay based on 100% active clay.

8. The printing ink of claim 7 wherein said organophilic clay comprises the reaction product of a sodium bentonite and methyl benzyl dihydrogenated tallow ammonium chloride.

9. The printing ink of claim 7 wherein said organophilic clay comprises the reaction product of hectorite with methyl benzyl dihydrogenated tallow ammonium chloride.

10. The printing ink composition of claim 7 wherein said organophilic clay gellant comprises from 0.1% to 5% by weight of said printing ink.

11. A process for preparing a printing ink, which comprises:
 (a) forming a dispersion of an ink coloring material with an organic ink vehicle;
 (b) preparing a mixture by combining with said dispersion an organophilic clay gellant comprising the reaction product of a smectite-type clay having a cation exchange capacity of at least 75 milliequivalents per 100 grams of clay and a methyl benzyl dialkyl ammonium compound or a dibenzyl dialkyl ammonium compound wherein the alkyl groups contain 14 to 22 carbon atoms, the amount of said ammonium compound reacted with said clay being from 100 to 120 milliequivalents per 100 grams of clay based on 100% active clay; and
 (c) shearing said mixture between rotating rollers to prepare a viscous printing ink.

12. The process of claim 11 wherein said clay is hectorite or sodium bentonite.

13. The process of claim 11 wherein said alkyl groups are 16 or 18 carbon atoms.

14. The process of claim 11 wherein 20% to 35% of said alkyl groups contain 16 carbon atoms and 60% to 75% contain 18 carbon atoms.

15. The process of claim 11 wherein said organophilic clay gellant comprises from 0.1% to 5% by weight of said printing ink.

16. The process of claim 11 wherein said organophilic clay gellant comprises from 1.0% to 3.0% by weight of said printing ink.

* * * * *